United States Patent Office 3,091,573
Patented May 28, 1963

3,091,573
QUICK ACTING INSULIN PREPARATION
Jørgen Schlichtkrull, Bronshoj, Denmark, assignor to Novo Terapeutisk Laboratorium A/S, Fuglebakkevej, Copenhagen, Denmark
No Drawing. Filed July 29, 1958, Ser. No. 751,636
Claims priority, application Denmark May 12, 1958
2 Claims. (Cl. 167—75)

After the appearance of clinically useful insulin preparations having a prolonged insulin action, insulin solutions which are known to be quick-acting have gradually been replaced by these more suitable insulin preparations. Insulin solutions, however, nowadays have three applications each of which renders these solutions indispensable in therapy, i.e. in the shock treatment of psychiatry, in the treatment of acute emergencies in diabetes therapy, and the employment in combination with the insulin preparations having a prolonged action in the daily treatment of diabetics. In numerous cases where use is made of aqueous suspensions of amorphously precipitated zinc-protamine-insulin having a highly protracted effect, it is advantageous to add thereto an insulin solution which is admixed in the injection syringe. It will often be advisable to make use of such admixture when employing an aqueous suspension of crystalline zinc-protamine-insulin.

In all cases where it is desired to use an addition of insulin in solution or where such addition will be used, it should, however, be taken into consideration that the insulin solutions used up to now are incompatible with the insulin preparations having a protracted effect so far as the acidity is concerned. While most frequently the preparations having a protracted effect are neutral insulin suspensions, the insulin solutions used up to now are acid and have a pH-value of about 3, as they have been produced by dissolving amorphous or particularly crystalline insulin in a diluted acid, usually hydrochloric acid, to which has been added a preserving agent and a substance making the solution isotonic and, if desired, a water-soluble zinc salt, e.g. zinc chloride. The said suspensions having a protracted effect, however, go into solution at such a low pH-value and are more or less unstable at the pH-value which will result after admixing the insulin in solution. As a consequence thereof the admixture of dissolved insulin creates an uncertainty in the treatment of diabetes and necessitates a quick application of the produced mixtures.

The present invention aims at the production of a quick-acting insulin preparation containing dissolved insulin as active constituent and being compatible with the insulin preparations having a protracted effect because it has neutral reaction, in contradistinction to the insulin solutions used up to now.

The invention is based on the discovery that insulin produced from pig pancreas, in the following called pig insulin, has such a high solubility at a pH-value of 7 to 8 that no insulin precipitates will be formed at this pH-value so that it is ensured that, even when ions of such metals, preferably zinc, which promote crystallization of the insulin, are present in the solution in a concentration being just sufficiently high for the crystallization of the insulin, even after prolonged storage no precipitation of crystalline insulin will take place, which crystalline insulin in aqueous suspension containing ions of zinc or the like metals in a higher concentration is known to show a very highly prolonged insulin activity.

It is surprising that when employing pig insulin it is possible to produce stable insulin solutions having a pH-value of 7–8.

The process according to the invention is thus characteristic in that pig insulin is dissolved in an aqueous injectable medium having or being given a pH-value of 7–8.

As mentioned in the foregoing in the production of the acid insulin solutions known up to now use has sometimes been made of an addition of zinc chloride. It is known that zinc ions and ions of other crystallization-promoting metals, such as cobalt, nickel and cadmium, reduce the solublity of the insulin at neutral reaction. Hence, if in the process according to the invention use is made of an addition of a water-soluble zinc salt or a salt of one of the other crystallization-promoting metals, or if use is made of insulin having a high content of these metals, care should be taken that the produced insulin solution will be made to have such content of zinc ions or the like ions that no insulin precipitation will take place.

In the production of preparations with neutral reaction and having a protracted effect and consisting of an aqueous suspension of an insulin precipitate it is known to make use of a buffering substance in order to maintain the neutral reaction. Examples of such buffering substances are phosphate-, citrate-, acetate-, borate-, maleate-, diethylbarbiturate- and glycerol-buffers.

It is also known that certain of these buffering substances bind ions of the said metals in such a way that the solubility of the insulin at neutral reaction is not reduced when together with the metal ions such buffering substances are present. Thus ions of all the said metals are complex-bound by citrate buffer.

The process according to the invention is therefore further characterized by the fact that, if use is made of an addition of a solution of a compound of one or more of the metals, such as zinc, cobalt, nickel and cadmium, which are prerequisite to the crystallization of insulin, or of insulin having a high content of these metals, in the absence of substances, such as buffering substances forming slightly soluble or complex compounds with the said metals, the solution is given a content of the metals of less than about $13 \times A \times 10^{-3}$ milliequivalents per litre, "A" indicating the number of international units of insulin per millilitre. With zinc as an example and an insulin concentration of 40 international units per millilitre, the produced solution should in the absence of e.g. phosphate and citrate buffers contain less than about 1.7 mg. percent of zinc. If, however, phosphate of citrate buffers are present, the produced preparation may contain considerably more zinc if only the amount of zinc ions being at the disposal of the insulin and consequently not bound by the buffering substance does not exceed the above mentioned upper limit.

Further, the fact is, in view of the stability of the solution when stored for a long period of time, that the upper limit for the content of the said metals in the insulin solution is dependent on the pH-value and the storage temperature of the solution. The higher the metal content and the lower the storage temperature, the higher the pH-value of the solution should be in order that the latter be stable at prolonged storage.

U.S.A. Patent No. 2,920,014 (application No. 692,612) and U.S.A. Patent No. 3,058,885 (application No. 738,011) claim processes for the production of aqueous insulin crystal suspensions having a protracted effect, a neutral reaction, and a relatively low content of zinc or the like metals. The insulin solutions produced according to the present invention are excellently appropriate for being admixed with the insulin preparations produced according to the said patents, the said mixing giving these preparations a desired initial effect. The mixing may even take place on an industrial scale before the preparations are marketed, as the produced mixtures are completely stable even after prolonged storage under the conditions prevailing in practice.

The below working examples further illustrate the process according to the invention.

Example 1

1.74 grams (40,000 units) of amorphous zinc-free pig insulin are dissolved in 500 millilitres of water containing 2 millilitres of 1 n HCl, 50 grams of glucose and 2 grams of phenol. The solution is sterile-filtered, neutralized with 1 n NaOH to pH=7.6 and diluted with sterile water to 1000 millilitres.

Example 2

1.74 grams (40,000 units) of crystalline pig insulin containing about 0.4% of Zn are dissolved in 500 millilitres of water containing 2 millilitres of 1 n HCl, 50 grams of glucose, and 1 gram of methyl-p-hydroxyl benzoate. The solution is sterile-filtered and neutralized with 500 millilitres of a sterile solution of 0.02 molar sodium phosphate (pH=7.5). If necessary, the pH of the mixture is re-adjusted with 1 n NaOH to pH=7.3 to 7.5. As will be seen from the foregoing, 1.74 grams (4,000 units) of crystalline pig insulin containing 0.4% of metal (zinc) are dissolved in 500 millilitres of water and this solution is subsequently mixed with 500 millilitres of a sterile sodium phosphate solution to provide a total solution of approximately 1 liter. Thus, the final preparation contains 6.96 mg. of metal per liter and, since the insulin concentration is 40 units per cc., the final preparation contains about $5 \times A \times 10^{-3}$ milliequivalents of the metal per litre.

Example 3

1.74 grams (40,000 units) of crystalline pig insulin containing about 0.7% of Zn are dissolved in 400 millilitres of water containing 2 millilitres of 1 n HCl and 1 gram of methyl-p-hydroxy benzoate. The solution is sterile-filtered and admixed with 500 millilitres of a sterile solution containing 1.4% of NaCl and 0.02 molar sodium acetate. pH is adjusted to 7.3–7.5 with 1 n NaOH, whereafter the solution is diluted with sterile water to 1000 millilitres.

In all the above examples the produced solutions have an insulin content of 40 international units per cc. It is, however, according to the invention also possible to produce more concentrated solutions, having e.g. an insulin content of 80 international units per cc. With increasing insulin concentration, the composition of the solutions being otherwise identical, an increasing pH-value should be used in order to ensure that no insulin is precipitated from the solutions when stored. As stressed above, the content of zinc and the like metals of the solutions and the kind of the used buffer, if any, will, however, influence the solubility of the pig insulin, which should also be taken into consideration when using higher insulin concentrations.

Having thus fully described my invention I claim as new and desire to secure by Letters Patent:

1. A quick-acting insulin preparation suitable for injection into human beings, and characterized by being stable even during prolonged storage and by compatibility with insulin crystal suspensions having a protracted effect, consisting of a sterile solution of pig insulin in an aqueous injectable medium, said preparation having a pH-value of about 7 to 8 and containing ions of at least one metal selected from the group consisting of zinc, cobalt, nickel, and cadmium, in an amount of at least $5 \times A \times 10^{-3}$ but less than $13 \times A \times 10^{-3}$ milliequivalents per litre, wherein A represents the number of international units of insulin per millilitre of the preparation.

2. A quick-acting insulin preparation as defined in claim 1, wherein said pig insulin is crystalline pig insulin.

References Cited in the file of this patent
UNITED STATES PATENTS

| | | |
|---|---|---|
| 2,537,757 | Hermann | Jan. 9, 1951 |
| 2,595,278 | Maxwell | May 6, 1956 |

OTHER REFERENCES

Hallas-Moller: Science, vol. 116, No. 3015, Oct. 10, 1952, pages 394–397.

U.S. Dispensatory, 25th ed., 1955, pp. 680–681.